Patented Sept. 5, 1950

2,521,078

UNITED STATES PATENT OFFICE 2,521,078

MIXTURES OF INTERPOLYMERS

Albert W. Meyer, Nutley, N. J., assignor to United States Rubber Company, New York, N. Y., a corporation of New Jersey No Drawing. Application October 16, 1948, Serial No. 55,025

4 Claims. (Cl. 260—45.5)

This invention relates to a method of improving the properties of surface coatings, and to improved coating compositions comprising mixtures of (A) an interpolymer of a styrene, a diallylic fumarate and an allylic alcohol, and (B) an interpolymer of certain acrylic esters and diallylic fumarates, as well as to improved surface coatings produced therefrom.

It is an object of this invention to provide a heat-convertible plasticizer, i. e., flexibilizing agent, which is compatible with the ternary interpolymers of a styrene, a diallylic fumarate and an allylic alcohol.

It is a further object of this invention to provide a plasticizer which is copolymerizable with interpolymers of a styrene, a diallylic fumarate and an allylic alcohol, to yield films or surface coatings of good flexibility, i. e., coatings which will not crack readily when the surface supporting the coating is bent or strained.

Another object of my invention is to provide a plasticized composition of the ternary interpolymer of a styrene, diallylic fumarate and allylic alcohol which can be further polymerized without discoloration to an insoluble, infusible surface coating that is free from haze or surface blush.

Solutions of interpolymers of a styrene, a diallylic fumarate and an allylic alcohol in organic solvents, as disclosed in the application of P. O. Tawney, Serial No. 788,958, filed November 29, 1947, are particularly useful as surface coatings which may be converted readily by heating into hard, insoluble, infusible, chemically resistant films of good properties. It has been desired to provide for these allylic alcohol interpolymers a compatible plasticizer, particularly a heat-convertible, copolymerizable plasticizer, which would be capable of imparting high flexibility to these films without impairing the excellent resistance of the films to heat and solvents and without causing discoloration of the films during baking.

For this purpose, partially polymerized acrylic acid esters such as polyethyl acrylate (e. g., the material commercially available under the trade name "Acryloid C-5") have been added to the interpolymer solution to be employed as a surface coating. This expedient has proven unsatisfactory, however, since the polyethyl acrylate, unless its molecular weight is undesirably low, is not compatible with the allylic alcohol interpolymer, and surface coatings formed from such mixtures are characterized by an undesirable haze or surface blush, indicating that the system is not completely homogeneous. Furthermore, the polyethyl acrylate, having no ethylenic unsaturation, does not cross-link with the allylic alcohol interpolymer, with the result that the cured surface coating has inferior properties.

I have now found, unexpectedly, that when an acrylic ester of a certain class is copolymerized in certain proportions with a diallylic fumarate to a soluble, fusible stage, the resulting copolymer is readily compatible with the ternary interpolymer of styrene, a diallylic fumarate and an allylic alcohol, and serves to plasticize or flexibilize the allylic alcohol interpolymer without impairing the resistance of the films to the action of heat and solvents and without introducing haze or surface blush into the films.

In general, in carrying out my invention, a soluble, fusible interpolymer of one of certain acrylic esters with a diallylic fumarate is prepared by any suitable known means and is then blended with a soluble, fusible interpolymer of a styrene, an allylic alcohol and a diallylic fumarate. The blended composition is then applied to the surface to be coated, suitably in the form of a solution in an organic solvent, as by brushing, spraying or dipping, and is baked to the insoluble, infusible state to form the improved surface coating of this invention.

The esters of acrylic acid which are employed in preparing the copolymerizable plasticizer comprise certain lower alkyl acrylates, viz., the acrylic esters of saturated aliphatic monohydric alcohols having 2 to 8 carbon atoms, i. e., ethyl acrylate, propyl acrylate, butyl acrylate, amyl acrylate, hexyl acrylate, heptyl acrylate, n-octyl acrylate, 2-ethylhexyl acrylate and corresponding isomeric alkyl acrylates. Ethyl acrylate is preferred.

The diallylic fumarates employed in preparing the copolymerizable plasticizer comprise diallyl fumarate and dimethallyl fumarate. Diallyl fumarate is preferred.

In order to be compatible with the allylic alcohol interpolymer and in order to form a readily heat-convertible mixture therewith, I have found it necessary that the acrylic ester-diallylic fumarate copolymer, the plasticizer of this invention, be prepared from a mixture containing at least 5 mole-percent, and not more than 50 mole-percent, of the diallylic fumarate and correspondingly from 95 to 50 mole-percent of the alkyl acrylate. The preferred proportions are about 85 mole-percent of alkyl acrylate and correspondingly about 15 mole-percent of diallylic fumarate. These two monomers are copolymerized to the soluble, fusible stage, suitably by carrying out the copolymerization in the presence of a regulating solvent or diluent effective to prevent gelation of the copolymer. The solvent may typically constitute about 50 to 90% of the total weight of the reaction mixture and the aforesaid monomers correspondingly 50 to 10% by weight.

Xylene is the preferred regulating solvent or diluent in making my plasticizers, although other solvents, e. g., toluene, may be used. A small amount of a conventional peroxidic polymerization catalyst, generally an organic peroxide, such as acetyl peroxide, benzoyl peroxide, acetyl benzoyl peroxide, succinyl peroxide, tertiarybutyl hydrogen peroxide, etc., is added to the mixture and polymerization is effected by heating, conveniently at reflux temperature. The heating is stopped before gelation occurs. A suitable length of time for the heating is, e. g., from 1 to 10 hours at 50° to 130° C. If desired, the acrylic ester-diallylic fumarate interpolymer may be recovered from the solution in which it is prepared by evaporating the solvent, or by precipitating the interpolymer with a non-solvent such as methanol. It is generally unnecessary, however, to isolate the acrylic esterdiallylic fumarate interpolymer, since the solution of the plasticizer may itself conveniently be blended with the surface coating solution. For purposes of blending with the allylic alcohol ternary interpolymer coating composition, the solids content of the plasticizer solution may be adjusted to about 15 to 20% by weight, for example.

The allylic alcohol ternary interpolymer which is the base of the coating composition, and with which the copolymerizable plasticizer is mixed, is prepared from a styrene, a diallylic fumarate, an allylic alcohol, and a peroxide polymerization catalyst, as described in application Serial No. 788,958 referred to above. As set forth in the application, the styrenes employed are those wherein the vinyl group is intact, and include, in addition to styrene itself, other vinyl-substituted benzenes such as p-chlorostyrene or p-methylstyrene. Styrenes which contain a further substituent attached to the vinyl group, such as alpha, p-dimethylstyrene, may not be used. The diallylic fumarates employed are the same as those set forth above for use in preparing the acrylic ester copolymer (the plasticizer), viz., diallyl fumarate and dimethallyl fumarate. The allylic alcohols employed include allyl alcohol and methallyl alcohol.

At least 10% of the allylic alcohol (based on the weight of the allylic fumarate), and preferably larger amounts such as from 300 to 700%, are employed in preparing the allylic alcohol ternary interpolymer. The higher the amount of allylic alcohol present, the higher is the proportion of monomeric fumarate and styrene which can be converted to the polymeric stage without insolubilization. The mole ratio of diallylic fumarate to styrene in the monomers charged may range from 1:1 to 1:6 or more, although it is preferred to employ from 1 to 3 moles of styrene per mole of allylic fumarate. In order to bring about interpolymerization, the reaction mixture may be heated at about 25° C. to 120° C., or higher, in the presence of a conventional peroxidic catalyst, e. g., benzoyl peroxide, as set forth above in the directions for preparing the copolymerizable plasticizer. The course of the interpolymerization can be followed by observing the increase in viscosity of the reaction mixture, and when the interpolymerization has proceeded to the desired extent, the reaction is halted by cooling. The resulting interpolymer can be isolated from the reaction mixture by distilling out any unreacted starting materials or by extracting them with a solvent in which the polymer is insoluble, such as gasoline.

If desired, solvents may be present in the original reaction mixture containing the three monomers. For example, 20 to 50% of the weight of the reaction mixture may be xylene or other organic solvent.

At the completion of the interpolymerization, a small amount of the polymerization inhibitor, such as hydroquinone, may be added to prevent gelation of the mixture during further processing or storage.

The resulting allylic alcohol ternary interpolymers may be isolated and purified by conventional means if desired. The products are generally colorless solids. Typical products may contain, for example, about 50% by weight of diallyl fumarate, about 25% by weight of styrene, and about 35% by weight of allyl alcohol. They contain, attached to the polymer chain, hydroxymethyl groups derived from the interpolymerized allylic alcohol molecules, which renders the copolymers capable of modification by agents capable of reaction with primary alcohols, e. g., alkyl halides, organic acids, etc. The products contain residual unsaturation, and application of heat, particularly in the presence of catalysts, induces further polymerization to the insoluble, infusible state. The unsaturated products are soluble in many organic solvents, e. g., acetone, xylene, etc.

It is generally unnecessary to isolate the allylic alcohol ternary interpolymer in order to use it in surface coatings. For most purposes, it is sufficient to add a solvent entrainer, such as xylene, to the crude interpolymer mixture and to distill off the unreacted material along with the entrainer, additional entrainer being added during the distillation if necessary. After the interpolymer is sufficiently purified, the solids content of the solution may be adjusted by adding solvent to give a solution of suitable viscosity for the particular method of application to be used.

Having prepared the copolymer of acrylic ester and diallylic fumarate (the plasticizer), and the surface coating allylic alcohol ternary interpolymer (the surface coating base), I blend the two materials, conveniently in the form of solutions in organic solvents such as xylene, acetone, ethyl acetate, diacetone alcohol, etc. I have found that the proportions of the two polymers which may be blended into a homogeneous coating solution which may be converted by heat to surface films which are free of haze or bloom and which have good flexibility may vary, in general, from 10% to 90% by weight of the allylic alcohol ternary interpolymer and correspondingly from 90 to 10% of the acrylic ester-diallylic fumarate interpolymer based on the combined weights of the two polymers in the mixture. However, it is preferred to employ from 50% to 90% of the allylic alcohol interpolymer and correspondingly from 50% to 10% of the acrylic ester interpolymer. Both interpolymers, containing appreciable ethylenic unsaturation, are copolymerizable with each other upon being heated together in the form of a thin film or coating.

The optimum range of proportions to employ in any particular case depends on a number of factors, such as the composition of the allylic alcohol interpolymer and the composition of the acrylic ester interpolymer, as well as on the curing properties, and other properties, desired in the surface coating. In general, the higher the proportion of diallylic fumarate in the acrylic ester interpolymer, the broader is the range of proportions over which it will be compatible with the allylic alcohol interpolymer, the lesser is its plasticizing effect, and the longer is the time required to cure the coating. The higher the proportion of styrene in the allylic alcohol ternary interpolymer the narrower is the range of proportions over which it will be compatible with the acrylic ester interpolymer, the more flexible the coating will be, and the greater will be the time and/or temperature required to cure the coating.

The resulting improved coating composition may be applied to the surface to be coated by any known means, such as by brushing, spraying or dipping. If desired, the surface to be coated may be first prepared with a priming coat.

The coating is then converted to the insoluble, infusible state by baking in air. Suitable baking temperatures are from 200° to 600° F. Preferably, a small quantity of a manganese drier, e. g., 0.05% of manganese as manganese naphthenate (on the combined weights of the blended interpolymers), is added to the coating solution. The plasticizer of this invention and the allylic alcohol interpolymer are copolymerized to the insoluble, infusible state by the baking.

It will be found that the surface films of my invention have greatly improved flexibility or elongation, compared with films formed from the unmodified ternary interpolymer of styrene, diallylic fumarate and allylic alcohol, while they retain the good resistance of the latter to heat and solvents. For example, whereas the extensibility of films prepared with the unmodified allylic alcohol interpolymer is only 0 to 2%, that of the improved films of this invention containing my plasticizer copolymerized therewith is generally from 6 to 14%. In addition, the baked surface coating is free from haze or blush, indicating that my acrylic ester-diallylic fumarate plasticizer is completely compatible with the allylic alcohol interpolymer, unlike previously tried flexibilizing agents.

It is also advantageous in many cases to include in the formulation of my coating compositions a quantity of a suitable pigment such as titanium dioxide, lithopone, antimony oxide, lead chromate, etc., in amount equal to about 25 to 100% on the total weight of interpolymers in the blend. The adhesion of the coating to the base is thereby markedly improved.

The following examples illustrate the invention in more detail. Parts are given by weight.

A soluble, fusible interpolymer of styrene, diallyl fumarate and allyl alcohol was first prepared by refluxing 104 parts of styrene, 196 parts of diallyl fumarate, 350 parts of allyl alcohol, 350 parts of xylene and 8.5 parts of benzoyl peroxide at 100° C. for 10 hours. After refluxing, 0.15 part of hydroquinone (inhibitor) was added to the interpolymer solution and unreacted monomers were distilled off at 65 to 75° C. and at 100 to 300 mm. of Hg pressure over a period of 20 hours. Additional xylene was added to the still pot as entrainer for the monomers from time to time during the distillation. The solids content of the purified allyl alcohol interpolymer solution was finally adjusted to a value of 50% in xylene.

Four batches of ethyl acrylate-diallyl fumarate interpolymer were then prepared, for use as plasticizer for the allylic alcohol interpolymer. The plasticizers were prepared by refluxing the amounts of ingredients shown in the table below for the specified times and temperatures. The resulting ethyl acrylate interpolymer solutions were then blended, without purification, with portions of the allyl alcohol interpolymer solution and with a quantity of pigment in amounts shown in the table, the pigment being first dispersed in a portion of the allyl alcohol interpolymer solution on a three-roll paint mill. The resulting homogeneous coating compositions were then sprayed onto steel test panels to give uniform films of thickness of 1.0±0.1 mil. The coatings were converted to the insoluble, infusible state by baking in air at 400° F. for the times shown. The elongation of the coatings at break was then determined with a conical mandrel test apparatus according to the A. S. T. M. standard method of test designated D522-41, which is a measure of the flexibility of the coating. The relatively high elongations shown in the table are in marked contrast to the low elongation of similarly prepared coatings which contained no ethyl acrylate interpolymer as plasticizer and which were capable of only 0 to 2% elongation. The coatings prepared from my compositions were free from discoloration, unlike coatings in which it was attempted to plasticize the interpolymer with other substances, e. g., with partially polymerized diallyl phthalate, which resulted in undesirable discoloration when the coating was baked.

| Plasticizer Preparation Number | 1 | 2 | 3 | 4 |
| --- | --- | --- | --- | --- |
| Ingredients (parts by weight): | | | | |
| ethyl acrylate | 80 | 95 | 85 | 85 |
| diallyl fumarate | 29 | 9.8 | 29.4 | 29.4 |
| benzoyl peroxide | 1 | 1 | 1 | 1 |
| xylene | 400 | 420 | 46.2 | 46.2 |
| Reflux time, hrs | 5 | 5 | 5 | 10 |
| Temperature, °C | 136 | 133 | 130 | 130 |
| Solids in adjusted plasticizer solution, percent | 19.0 | 19.2 | 17.0 | 17.1 |
| Coating Composition (parts by weight): | | | | |
| Allyl alcohol interpolymer solids (added as 50% solution in xylene) | 41.25 | 41.25 | 41.25 | 41.25 |
| Plasticizer solids (added as solution prepared above) | 13.75 | 13.75 | 13.75 | 13.75 |
| Titanium dioxide (pigment) | 45.0 | 45.0 | 45.0 | 45.0 |
| Time of baking (minutes at 400° F.) | 30 | 50 | 25 | 25 |
| Elongation of film at break, percent | 8.7 | 14.0 | 8.7 | 6.9 |

Similarly improved surface coatings are obtained when the plasticizer or flexibilizing agent is prepared from propyl acrylate, butyl acrylate, amyl acrylate, hexyl acrylate, heptyl acrylate, n-octyl acrylate or 2-ethylhexyl acrylate in place of ethyl acrylate. Likewise, similarly improved surface coatings are obtained when the plasticizer is prepared from dimethallyl fumarate in place of diallyl fumarate.

Having thus described my invention, what I claim and desire to protect by Letters Patent is:

1. A soluble, fusible, heat-convertible surface coating composition comprising a soluble, fusible, unsaturated ternary interpolymer of a styrene selected from the group consisting of styrene, p-chlorostyrene, and p-methylstyrene, a diallylic fumarate and an allylic alcohol, the allylic groups in each of said two last mentioned compounds being selected from the group consisting of allyl and methallyl, and said interpolymer being derived from an interpolymerizable mix comprising from 1 to 6 moles of said styrene per mole of said diallylic fumarate and from 10% to 700% by weight of said allylic alcohol, based on the weight of said diallylic fumarate, in combination with a soluble, fusible, copolymerizable interpolymer of a diallylic fumarate and an alkyl acrylate produced by polymerization of a monomeric mix of a diallylic fumarate selected from the group consisting of diallyl fumarate and dimethallyl fumarate and an acrylic ester selected from the group consisting of acrylic esters of saturated monohydric alcohols having 2 to 8 carbon atoms, in mole ratio of from 5:95 to 50:50, the weight ratio in the coating composition of said ternary interpolymer to said diallylic fumarate-alkyl acrylate interpolymer being from 10:90 to 90:10.

2. A soluble, fusible, heat-convertible surface coating composition comprising a soluble, fusible, unsaturated ternary interpolymer of styrene, diallyl fumarate, and allyl alcohol said interpolymer being derived from an interpolymerizable mix comprising from 1 to 6 moles of styrene per mole of diallyl fumarate and from 10% to 700% by weight of allyl alcohol based on the weight of the diallyl fumarate in combination with a soluble, fusible, copolymerizable interpolymer of diallyl fumarate and ethyl acrylate produced by polymerization of a monomeric mix of diallyl fumarate and ethyl acrylate in mole ratio of from 5:95 to 50:50, the weight ratio of said ternary interpolymer to said diallyl fumarate-ethyl acrylate interpolymer in the coating composition being from 50:50 to 90:10.

3. An article having an insoluble, infusible surface coating comprising a ternary interpolymer of a styrene selected from the group consisting of styrene, p-chlorostyrene, and p-methylstyrene, a diallylic fumarate and an allylic alcohol, the allylic groups in each of said two last mentioned compounds being selected from the group consisting of allyl and methallyl, and said interpolymer being derived from an interpolymerizable mix comprising from 1 to 6 moles of said styrene per mole of said diallyl fumarate and from 10% to 700% by weight of said allylic alcohol, based on the weight of said diallylic fumarate, and said ternary interpolymer being copolymerized with an initially soluble, fusible interpolymer of a diallylic fumarate and an alkyl acrylate produced by polymerization of a monomeric mix of a diallylic fumarate selected from the group consisting of diallyl fumarate and dimethallyl fumarate and an acrylic ester selected from the group consisting of acrylic esters of saturated monohydric alcohols having 2 to 8 carbon atoms in mole ratio of from 5:95 to 50:50, the weight ratio of said ternary interpolymer to said diallylic fumarate-alkyl acrylate interpolymer in the coating being from 10:90 to 90:10.

4. An article having an insoluble, infusible surface coating comprising a ternary interpolymer of styrene, diallyl fumarate and allyl alcohol, said interpolymer being derived from an interpolymerizable mix comprising from 1 to 6 moles of styrene per mole of diallyl fumarate and from 10% to 700% by weight of allyl alcohol, based on the weight of the diallyl fumarate, copolymerized with an initially soluble, fusible interpolymer of diallyl fumarate and ethyl acrylate produced by polymerization of a monomeric mix of diallyl fumarate and ethyl acrylate in mole ratio of from 5:95 to 50:50, the weight ratio of said ternaryinterpolymer to said diallyl fumarate-ethyl acrylate interpolymer in the coating being from 50:50 to 90:10.

ALBERT W. MEYER.

REFERENCES CITED

The following references are of record in the file of this patent:

UNITED STATES PATENTS

| Number | Name | Date |
|---|---|---|
| 2,449,612 | Mast | Sept. 21, 1948 |
| 2,461,735 | Heiberger | Feb. 15, 1949 |

Certificate of Correction

Patent No. 2,521,078 — September 5, 1950

ALBERT W. MEYER

It is hereby certified that error appears in the printed specification of the above numbered patent requiring correction as follows:

Column 4, line 22, for "35%" read *25%*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*